United States Patent [19]
Gould et al.

[11] 3,718,721
[45] Feb. 27, 1973

[54] METHOD FOR CONTROLLING THE STATE OF CURE OF CURABLE ARTICLES

[76] Inventors: Eric G. Gould; Edward P. Davis, both of c/o Fort Dunlop, Erdington, England

[22] Filed: Jan. 26, 1970

[21] Appl. No.: 5,492

Related U.S. Application Data

[63] Continuation-in-part of Ser. No. 857,175, Sept. 11, 1969, Pat. No. 3,649,729, which is a continuation-in-part of Ser. No. 857,642, Sept. 10, 1969, abandoned, which is a continuation of Ser. No. 640,320, May 22, 1967, abandoned.

[30] Foreign Application Priority Data

Feb. 6, 1969 Great Britain..................6,388/69

[52] U.S. Cl. ..................264/40, 73/15, 264/315, 264/326, 425/29, 425/144
[51] Int. Cl. .....................B29h 5/02, G01n 25/00
[58] Field of Search........264/40, 236, 315, 326, 347; 73/15; 425/29, 143, 144, 162

[56] References Cited

UNITED STATES PATENTS

| | | | |
|---|---|---|---|
| 3,489,833 | 1/1970 | Lehnen | 264/315 |
| 3,360,993 | 1/1968 | MacMillan | 73/15 X |
| 3,188,853 | 6/1965 | Rosa et al. | 73/15 |

FOREIGN PATENTS OR APPLICATIONS 1,531,572 7/1968 France

OTHER PUBLICATIONS

Victor Paschkis, "A Study of Curing of Tires", Rubber Age, 4–1951, vol. 69, no. 1, pages 45 – 50.

Primary Examiner—Robert F. White
Assistant Examiner—J. H. Silbaugh
Attorney—Stevens, Davis, Miller & Mosher

[57] ABSTRACT

A method for controlling the state of cure of at least a part of a curable article during curing in a mould, in which a temperature sensing probe is inserted into a predetermined site in the article and the temperature of the site is monitored as a function of time. The state of cure of the site is computed from the temperature measurements and heating is discontinued when a predetermined state of cure has been reached, of which the following is a specification.

11 Claims, 1 Drawing Figure

PATENTED FEB 27 1973
3,718,721
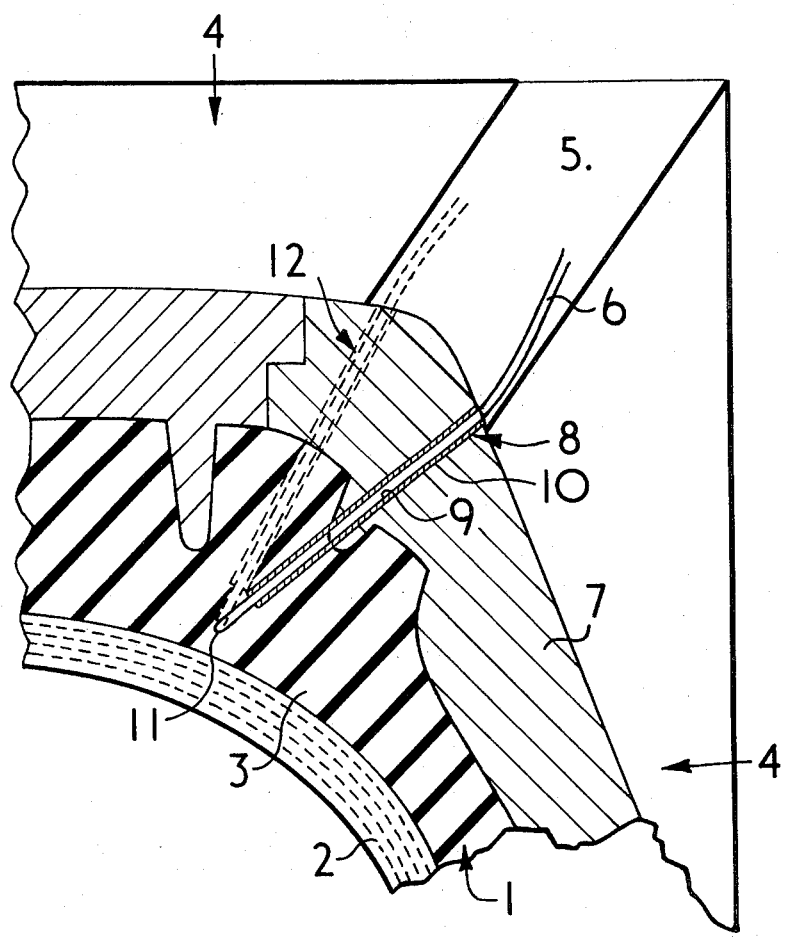

METHOD FOR CONTROLLING THE STATE OF CURE OF CURABLE ARTICLES

This application is a continuation-in-part of our copending application Ser. No. 857,175, filed Sept. 11, 1969, now U.S. Pat. No. 3,649,729, which is a continuation-in-part of Ser. No. 857,642, filed Sept. 10, 1969, now abandoned, which is a streamlined continuation of Ser. No. 640,320, filed May 22, 1967, now abandoned.

This invention relates to the curing of curable articles and is particularly concerned with controlling the state of cure of rubber articles.

In the manufacture of rubber articles, where the article is made from or includes a vulcanizable rubber compound, it is necessary to cure the compound by heating it to effect vulcanization. An optimum state of cure is obtainable for any given rubber compound, the physical properties of the cured rubber being adversely affected by substantial over or under cure.

Over cure or under cure is sometimes obtained on account of variations, during a cure of a predetermined duration, in the temperature of the steam utilized for heating moulds within which rubber articles are cured. Variation in the temperature of the mould can also take place due to variation in the ambient temperature, variation in the temperature of the heating media and the transfer of heat therefrom to an article to be cured, the degree of use to which the mould is put, i.e. the amount of heat extracted from the mould per unit time and the period during which the mould is left open between curing operations. It is, therefore, desirable to have a method of or an apparatus for, controlling the state of cure of the article.

According to the present invention, a method of controlling the state of cure of at least a part of a curable article during heat curing thereof in a mould comprises locating a temperature sensing probe at a predetermined site within the article, initiating the cure cycle by supplying heat to the article, monitoring the local temperature of said site as a function of time, computing therefrom the total state of cure of said part of the article as a function of time, and terminating the heat supply when a predetermined state of cure has been reached.

State of cure can be determined in terms of a number of cure units, one cure unit being defined as that cure received at the point under consideration in the article when maintained at a specified reference temperature for 1 minute.

The process of curing is a chemical reaction the rate of which depends on temperature. The relationship between temperature and rate of reaction can be determined experimentally and it can be shown that the relationship can be expressed by the Arrhenius equation thus:

$$t_1/t_2 = \exp[-E/R(1/T_2 - 1/T_1)]$$

where
R 32 Universal gas constant
E = activation energy. This is determined from the slope of a graph of log (time) against the reciprocal of the absolute temperature. A typical figure is 20 K.cal/mole
$t_1$ is the time to desired state of cure at steady temperature $T_1$
$t_2$ is the time to the same state of cure at steady temperature $T_2$ Thus if the time $t_1$ to reach a desired state of cure at a specified reference temperature $T_1$ is known, the time to reach the same state of cure at other temperatures can be calculated.

In practical cures the actual rubber temperature is not usually steady. However, the cure time at the reference temperature $T_1$ equivalent to the actual cure time $t_3$ during which the temperature has varied can be calculated using a method of numerical integration. This consists of dividing the time-temperature curve for the actual cure into small units of time $dt$, estimating the average temperature during the time interval $dt$ and converting this to the equivalent time of cure at the reference temperature $T_1$. These small increments of cure are then summed to give the equivalent total cure time at the reference temperature $T_1$ i.e. the state of cure.

Cure time at $$T_1 = \sum_0^{t_3} \exp\left(-\frac{E}{R}\left(\frac{1}{T}-\frac{1}{T_1}\right)\right)dt$$

where $T$ is the mean temperature during each time interval.

Instead of the Arrhenius equation it is possible to use empirical equations which fit the observed data e.g.

$$t_1/t_2 = (T_2 - T_1/C\ Y)$$

where $C$ and $Y$ are constants.

For a selected reference temperature of 287° F, the state of cure at any temperature $T°F$, after an elapsed time of cure of $t$ minutes is expressed as $(t \cdot C(T-287/Y)$ cure units, where $C$ and $Y$ are constants. The above expression has been determined experimentally and in one example for natural or synthetic rubber articles, $C = 2.0$ and $Y = 18$.

A third alternative is a polynomiall equation expressing the relationship between the change of properties with temperature and time.

The method of the invention thus renders it possible to calculate the state of cure at the point under consideration at any time in terms of aggregate number of cure units and to terminate the cure when the desired cure corresponding to a predetermined aggregate number of cure units has been obtained. The time of cure which will provide a specified number of cure units, will vary from one article to another sample of the same article, since as the cure temperature unavoidably varies so must the duration of cure to ensure that each article receives an adequate quota of cure units to ensure that the finished cooled article is not substantially over or under cured.

Conveniently the assessment of the relationship of the actual temperature of cure with the predetermined reference temperature of cure is not commenced until a predetermined minimum temperature of the point under consideration is attained, such minimum temperature, in one example, being 210° F., for natural or synthetic rubber materials used in pneumatic tire construction.

The total state of cure may be computed directly by monitoring the local temperature of said site as a function of time. In one instance the local temperature at said site is monitored at set intervals of time and the corresponding increments of cure summated for example by means of a digital computer. In another instance the local temperature at said site is monitored as a continuous function of time, and the change in total state of cure at every instant is integrated for example by means of an analogue device to give the accumulated state of cure at any instant.

Alternatively the total state of cure may be computed indirectly by monitoring the local temperature of said site as a function of time. The local temperature of said site may be monitored either at set intervals of time or continuously as a function of time, the deviation from a predetermined ideal temperature-time variation determined at regular intervals or continuously respectively, and an adequate correction applied by suitable adjustment of the heat supply so that the total state of cure may be computed by reference to the ideal temperature time variation.

The said predetermined state of cure may be less than the state of cure required in the completed article to compensate for the additional curing by the heat remaining in the article after the heat supply has been terminated due to the finite thermal diffusivity of the material of the article.

In addition often it is of advantage to allow the article to remain in the mould after the heat supply has been terminated and until such time as adequate cooling of the article has been achieved to allow the article to cool under controlled conditions. At the end of the cure cycle i.e. after the article has cooled sufficiently the mould is opened either manually or automatically. The latter may be carried out by actuation by the computer of a suitable device operably attached to the mould to open the mould, when the temperature sensing probe registers a suitable temperature.

Preferably the temperature sensing probe is located within the article at a site which after the heat supply has been terminated, has the lowest state of cure.

According to another aspect of the invention, apparatus for controlling the state of cure of at least part of an article during the heat curing thereof in a mould comprises a mould, a mould heating means, a mould cavity defined by the mould, a temperature sensing probe, a substantially rectilinear channel suitably disposed in the wall of the mould, communicating the mould exterior with the mould cavity, and adapted to allow said temperature sensing probe to pass therethrough, monitoring means connected to the temperature sensing probe, for monitoring signals received therefrom as a function of time, computing means co-operating with the monitoring means for computing the total state of cure of the part of the article, and means for rendering the mould heating means inoperative when a predetermined state of cure has been reached.

The temperature sensing probe may be provided with a reinforcing sheath to impart the necessary rigidity thereto.

The said sheath may comprise a metal or alloy of suitable modulus suitable results having been obtained with stainless steel.

It is preferable that the temperature sensing probe comprises a thermocouple although other temperature sensing means e.g. a resistance thermometer, may be adapted to the present application.

It is also preferred that the thermocouple leads are insulated over the length of the temperature sensing probe thus limiting heat transmitted by conduction, from regions of the article or mould not under observation, through the leads to the couple thermo-junction, it being found that mineral insulations are particularly applicable in this respect e.g. magnesium oxide.

Temperature sensing probes may be provided at several different locations in a single article and the signals from all of these fed to a computer which selects only that temperature value which indicates that that point will have the lowest state of cure at the time when the heat supply is terminated.

An alarm system may be provided which is operable if any or all of the factors contributing to a satisfactory cure of the tire deviate substantially from a predetermined range of values.

The invention also includes an article cured by a method or on an apparatus according to the present invention e.g. a pneumatic tire.

One embodiment of the invention will now be described in more detail, by way of example only, with reference to the accompanying drawing.

A pneumatic tire 1 for a motor car is to be moulded and cured. The completed tire is of size 5.20 – 13 and is provided with a cross-ply carcass 2 comprising four plies and tread 3. A green flat band tire is fabricated on a collapsible cylindrical tire building former, and is then transferred to a mould 4. The mould 4 is of the steam-heated type. A rectilinear channel 5 is provided in the mould wall at a position corresponding to the lower shoulder region of the tire 1 to be moulded communicating the mould exterior with the mould cavity which is defined by the mould.

The channel 5 accommodates a temperature sensing probe 6 which is fixedly attached to a mould segment 7 at such an angle that the moulding and extract forces are minimized. The temperature sensing probe 6 comprises a thermocouple 8 sheathed in a 1 mm. diameter stainless steel tube 9 with mineral insulation (not shown) to insulate the thermocouple wires electrically and thermally from the sheath the thermocouple being reinforced over most of its length by means of a 1½ mm. diameter steel tube 10 to impart the necessary rigidity. The temperature sensing probe has a small thermo-junction 11 disposed at the end thereof. The mineral insulation employed is of magnesium oxide.

A thermocouple 12 is shown in the drawing in dotted lines to illustrate a possible alternative position for the thermocouple.

The e.m.f. generated across the thermo-junction of the thermocouple is fed into the input side of a suitably programmed analogue computer, so that the temperature registered by the thermocouple may be monitored as a continuous function of time. The computer is operably connected to the heat supply and controls the mould opening mechanism.

In use after positioning the green flat band tire within the mould, having provided it with a steam-heated diaphragm, the mould is closed while the tire is shaped into the toroidal configuration of a completed tire. The mould cavity is provided in the region thereof that will form the tread of the tire, with a moulding matrix incorporating blades suitably arranged to mould the desired tread pattern on the tire tread.

The temperature sensing probe after shaping becomes embedded within the lower shoulder region of the uncured shaped tire as shown in the drawing.

The lower shoulder region of a cross-ply tire is considered a suitable region for temperature time determination since it is this region of the tire that has the lowest state of cure at the time of removal from the mould. It should be noted however that the same does not always apply to radial ply tires where it is considered that the bead region of this type of tire may be a more suitable region for observation of the tire in accordance with the invention.

The local temperature of the shoulder region of the tire is monitored as a continuous function of time the change in the total state of cure being integrated continuously by an analogue computer. When a predetermined overall change in the total state of cure has been achieved the computer actuates a valve mechanism which controls the steam supply to shut it off. At such an instant, the computer actuates a mould-opening mechanism and the completed tire is removed.

The mould is loaded with another green flat band tire and then closed and the computer again assumes control of the curing cycle.

In a modification of the preceding embodiment, the invention is adapted for use with a mould of the twin type.

Two green flat band tires are loaded into the two portions of the mould. The mould is closed, the tires shaped each tire having been provided with a temperature sensing probe as described in the preceding embodiment. However, in this instance both temperature sensing probes are connected to the computer, the computer receiving both sets of signals, selecting only the signals from that tire which will have the lower state of cure when it is extracted from the press at the end of the curing cycle and basing the determination of total state of cure on these results.

In all other respects the method is similar to that described in the preceding embodiment.

Different cure cycles are utilized for different types of tire constructions e.g. whether they have rayon, nylon or steel cords in the breaker or carcass.

For example, when a tire having a carcass formed of rubberized rayon cords is being cured the opening of the curing press is initiated when the comparison of the measured temperature with the reference temperature of cure and the elapsed time of cure indicates that the state of cure is such that no porosity will develop in the tire upon release of pressure within the press. This adequate state of cure is of course predetermined in terms of a specified number of cure units provided in a programme supplied to the computer device before the cure cycle is initiated.

However, when a carcass formed of rubberized nylon cords is cured it is necessary to cool the tire before the pressure is released within the press to prevent distortion or growth of the tire while the nylon is in a hot plastic state. In this case the measured temperature of the point under consideration is again compared with the reference temperature of cure and the elapsed time of cure accounted for until the computer device indicates that a satisfactory state of cure at said point is obtained. Upon completion of this cure, a cold flood is initiated within the press to cool the tire.

When the temperature has fallen to the required value the opening of the press is initiated. Again a satisfactory state of cure in terms of a specified number of cure units is provided for in a programme supplied to the computer device, and, in addition, the required cooled temperature is provided in a programme supplied to the computer.

However, when a post-cure inflation process is utilized in the curing of a rubberized nylon cord carcass no cold flood is necessary within the curing press since the hot tire is removed from the press and rapidly mounted upon a former, inflated and left to cool to substantially ambient temperature. In such a process the determination of an adequate state of cure to permit safe opening of the press is carried out in the same manner as that hereinbefore described for a rubberized rayon cord carcass.

When a carcass formed of rubberized steel cords is cured it is normal to give the tire an extended cold flood within the press to control accurately the total amount of cure in order to ensure an adequate rubber to steel bond. In this case the temperature is measured within the tire at a point dictated by bonding considerations, the elapsed time of cure is accounted for and, as in the case of a nylon construction, a cold flood is initiated when a satisfactory state of cure is obtained. However, in this steel cord construction, the temperature is then measured until the temperature has fallen to the required value at which time the opening of the press is initiated.

It will be appreciated that the temperature may be measured within the tire at two, or more than two, points by means of a suitable temperature sensing device.

Although the shoulder region of the tire has been referred to, the point under consideration may be, for example, at the crown of the tread or in a bead region. Also the invention is not limited to the determination of the state of cure during the vulcanization of pneumatic tires but may be equally applicable to other rubber or plastics articles and the invention also includes the control of the finally cured state of pneumatic tires or other rubber or plastics articles.

Having now described our invention what we claim is:

1. A method of controlling the state of cure of at least a part of a curable article during heat curing thereof in a mould comprising locating said article within a mould, said mould including a temperature sensing probe located in a channel extending therethrough, closing said mould and shaping the article against said mould, thereby locating said probe in a predetermined site within said article, initiating the cure cycle by supplying heat to the article, monitoring the local temperature of said site as a function of time, computing therefrom the total state of cure of said part of the article as a function of time and terminating the heat supply when a predetermined state of cure has been reached, said total state of cure of the part of the article being computed in terms of a number of cure units, one cure unit being that cure received at the point under consideration in the article when maintained at a specified reference temperature for one minute.

2. A method according to claim 1 in which the number of cure units is computed using the Arrhenius equation.

3. A method according to claim 1 in which the number of cure units is computed using the expression $tC^{(T_2-T_1)/Y}$ which gives the state of cure at a temperature $T_2$ where $t$ is the elapsed time of cure, $T_1$ is the predetermined reference temperature and $C$ and $Y$ are constants.

4. A method according to claim 3 in which the curable article is a natural or synthetic rubber article, $C = 2.0$ and $Y = 18$.

5. A method according to claim 1 in which the assessment of the relationship of the actual temperature of cure with the predetermined reference temperature of cure is not commenced until a predetermined minimum temperature of the point under consideration is attained.

6. A method according to claim 1 in which the total state of cure at the predetermined site is computed directly by monitoring the local temperature of the site as a function of time.

7. A method according to claim 1 in which the total state of cure is computed indirectly by monitoring the local temperature of said site as a function of time, the local temperature of the site and its deviation from a predetermined ideal temperature-time variation being determined at regular intervals or continuously, and an adequate correction being applied by suitable adjustment of the heat supply.

8. A method according to claim 1 in which the predetermined state of cure is less than the state of cure required in the finished article to compensate for the additional curing by the heat remaining in the article after the heat supply has been terminated.

9. A method according to claim 1 in which the temperature sensing probe is located within the article at a site which, after the heat supply has been terminated, has the lowest state of cure.

10. A method according to claim 1 in which the article is a rubber tire.

11. A method according to claim 10 in which the tire is a cross-ply tire and predetermined site is in the lower shoulder region of the tire.

* * * * *